US011356277B2

(12) United States Patent
Chasko et al.

(10) Patent No.: US 11,356,277 B2
(45) Date of Patent: Jun. 7, 2022

(54) AUTOMATED TAMPER DETECTION OF METER CONFIGURATION PARAMETERS

(71) Applicant: Landis+Gyr Innovations, Inc., Alpharetta, GA (US)

(72) Inventors: Stephen John Chasko, Marietta, GA (US); Damien Hugoo, Roswell, GA (US); Dave Stenberg, West Lafayette, IN (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 0 days.

(21) Appl. No.: 17/036,407

(22) Filed: Sep. 29, 2020

(65) Prior Publication Data
US 2022/0103371 A1 Mar. 31, 2022

(51) Int. Cl.
*H04L 9/32* (2006.01)
*H04W 24/10* (2009.01)

(52) U.S. Cl.
CPC ......... *H04L 9/3247* (2013.01); *H04L 9/3236* (2013.01); *H04W 24/10* (2013.01)

(58) Field of Classification Search
CPC ..... H04L 9/3247; H04L 9/3236; H04W 24/10
See application file for complete search history.

(56) References Cited

U.S. PATENT DOCUMENTS

2010/0240991 A1* 9/2010 Bartlett ............... A61B 8/00
2014/0097966 A1* 4/2014 Alexander ........... G01D 4/00

* cited by examiner

Primary Examiner — Ronald B Abelson
(74) Attorney, Agent, or Firm — Kilpatrick Townsend & Stockton LLP

(57) ABSTRACT

A method includes storing, at a head-end system, an indication of initial configuration parameters of a configurable resource meter. The method also includes requesting, by the head-end system, a report indicating updated configuration parameters from the configurable resource meter and receiving, at the head-end system, the report indicating the updated configuration parameters of the configurable resource meter. Additionally, the method includes comparing an indication of the updated configuration parameters to the indication of the initial configuration parameters. Further, the method includes determining a potential compromise of the configurable resource meter when the indication of the updated configuration parameters is different from the indication of the initial configuration parameters.

19 Claims, 4 Drawing Sheets

AUTOMATED TAMPER DETECTION OF METER CONFIGURATION PARAMETERS

TECHNICAL FIELD

Examples of the presently disclosed subject matter relate to resource metering devices. In particular, the presently disclosed subject matter relates to techniques for determining tampering to adjustable configuration parameters of resource metering devices.

BACKGROUND

Metering devices may include adjustable metering parameters. The adjustable metering parameters may be configured in particular ways to calibrate the metering devices and to provide the meters with utility specific parameters. In some examples, the utility specific parameters may alter the way the metering device collects consumption information, such as during peak usage hours, nighttime hours, and weekend hours. Other types of adjustable parameters may also be included to further customize the metering device for accuracy and to account for specific usage of the metering device. Tampering with the adjustable metering parameters may result in metering devices that inaccurately track consumption of a resource, or that incorrectly track additional features associated with the resource consumption, such as a time when the resource consumption occurs. The inaccurate or incorrect tracking may result in resource consumption billing that does not accurately or adequately account for resource consumption at a premises.

SUMMARY

Systems and methods for providing tampering detection of metering devices are provided.

According to various aspects of the present disclosure, A method includes storing, at a head-end system, an indication of initial configuration parameters of a configurable resource meter. The method also includes requesting, by the head-end system, a report indicating updated configuration parameters from the configurable resource meter and receiving, at the head-end system, the report indicating the updated configuration parameters of the configurable resource meter. Additionally, the method includes comparing an indication of the updated configuration parameters to the indication of the initial configuration parameters. Further, the method includes determining a potential compromise of the configurable resource meter when the indication of the updated configuration parameters is different from the indication of the initial configuration parameters.

In an additional example, a metering system includes a configurable metrology module that meters resource consumption and a radio that communicates with the configurable metrology module and with a head-end system. The radio includes a processor and a memory that includes instructions stored thereon. The instructions are executable by the processor to perform operations. The operations include receiving an indication of initial configuration parameters from the configurable metrology module upon linking with the configurable metrology module. The operations also include requesting a report indicating updated configuration parameters from the configurable metrology module. Further, the operations include comparing an indication of the updated configuration parameters with the indication of the initial configuration parameters. Furthermore, the operations include reporting a potential compromise of the configurable metrology module to a head-end system when the indication of the updated configuration parameters are different from the indication of the initial configuration parameters.

In an additional example, a head-end system includes a processor and a memory including instructions stored thereon. The instructions are executable by the processor for causing the processor to perform operations. The operations include storing an indication of initial configuration parameters of a configurable resource meter. The operations also include requesting a report indicating updated configuration parameters from the configurable resource meter. Additionally, the operations include receiving the report indicating the updated configuration parameters of the configurable resource meter. Further, the operations include comparing an indication of the updated configuration parameters to the indication of the initial configuration parameters. Furthermore, the operations include determining a potential compromise of the configurable resource meter when the indication of the updated configuration parameters is different from the indication of the initial configuration parameters.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE DRAWINGS

Aspects and features of the various examples will be more apparent by describing examples with reference to the accompanying drawings, in which.

DETAILED DESCRIPTION

While certain examples are described herein, these examples are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Certain aspects and examples of the disclosure relate to systems and methods used to discover tampering of metering devices. In particular, the tampering can include unauthorized changes to adjustable configuration parameters of the metering devices. The metering devices may be components of a mesh network associated with resource metering. In such an example, the metering devices may be used to provide resource metering information or status information to other devices in the mesh network, such as additional metering endpoints or a head-end system of the mesh network. In some examples, the metering devices can provide indications of adjustable configuration parameters of the metering devices to the head-end system.

The head-end system may receive the indications or reports of the adjustable configuration parameters from the metering devices. The head-end system compares the received indications of the configuration parameters with stored information about the configuration parameters. A difference between the received configuration parameters and the stored configuration parameters provides an indication that tampering may have occurred at the metering device. A more detailed retrieval of metering configuration parameters may be remotely requested upon determining the potential tampering. This additional accounting of the metering configuration parameters allows for more historical detail to help an investigator establish an audit trail for a date of compromise detection and potential dates of compromise.

In another example, a radio of the metering device may compare current configuration parameters of the metering device to configuration parameters of the metering device that were present at a time of first pairing between the radio and the metering device. When a discrepancy is determined between the current configuration parameters and the initial configuration parameters, the radio may transmit an indication of the discrepancy to the head-end system for further analysis.

The described examples provide techniques to detect tampering of configuration parameters of a metering device. While the describe techniques are discussed generally for use with a metering device providing resource metering functions, it is by no means so limited. Rather, examples of the technique may be used with configurable devices of any type or otherwise as desired.

Figure 1:
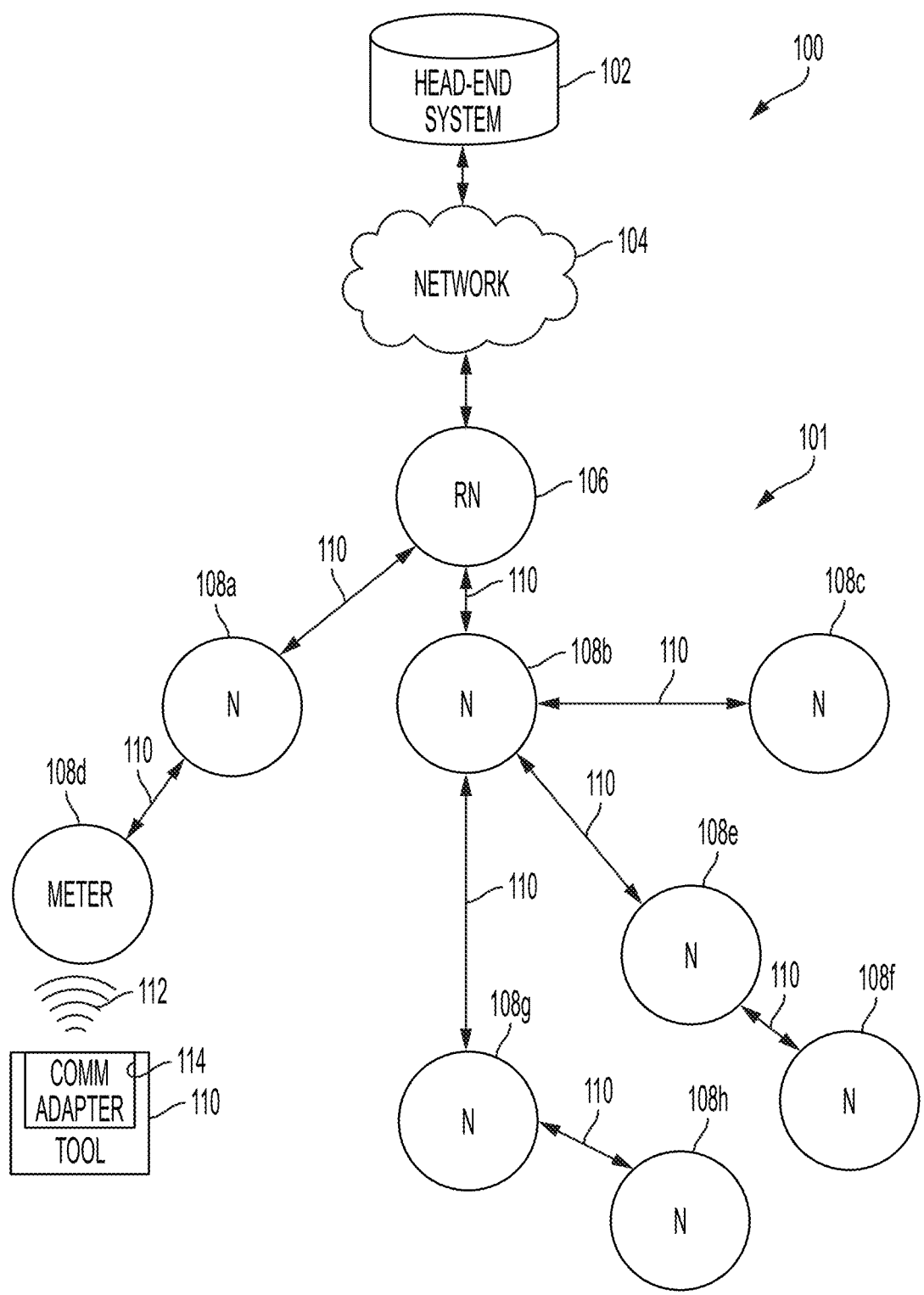
FIG. 1 is a block diagram of a networked system and a mesh network of smart devices, in accordance with one or more examples.

FIG. 1 is a block diagram illustrating an example of a networked system 100 and a mesh network 101. The networked system 100 and the mesh network 101 provide a network infrastructure for smart devices (e.g., resource consumption meters, vehicles, home appliances, etc. that include communication technology) to communicate across a network of nodes (i.e., other smart devices), the internet, and/or an intranet. The networked system 100 includes a head-end system 102, which may function as a central processing system that receives a stream of data from a network 104. The network 104 may be the internet, an intranet, or any other data communication network. The mesh network 101 may include a root node 106 and other nodes 108a-108h that collect data associated with the nodes 106 and 108a-108h, and the root node 106 transmits the collected data to the network 104 and ultimately to the head-end system 102 of the networked system 100. The root node 106 may be a personal area network (PAN) coordinator, an internet gateway, or any other device capable of connecting to the network 104.

The root node 106 may generally be referred to as a parent node due to data links with the nodes 108a and 108b that are located at a node layer (e.g., layer one) below the root node 106. For example, the root node 106 is illustrated as communicating directly with the network 104. As illustrated, nodes 108a and 108b may also be referred to as parent nodes due to data links with nodes 108c, 108d, 108e, and 108g that are located at a node layer (e.g., layer two) below the nodes 108a and 108b. Further, nodes 108e and 108g may be referred to as parent nodes due to data links with nodes 108f and 108h that are located at a node layer (e.g., layer three) below the nodes 108e and 108g. The nodes 108a-108h may all funnel information up through the node layers to the root node 106 and ultimately to the head-end system 102.

In operation, fewer or more nodes 108 may be included in the mesh network 101, and more root nodes 106 may also be included in the networked system 100. Additionally, while the mesh network 101 depicted in FIG. 1 includes a root node layer (i.e., the root node 106), layer one (i.e., the nodes 108a and 108b), layer two (i.e., the nodes 108c, 108d, 108e, and 108g), and layer three (i.e., the nodes 108f and 108h), fewer or more node layers are also contemplated. Moreover, while FIG. 1 depicts a specific network topology (e.g., a DODAG tree topology), other network topologies are also possible (e.g., a ring topology, a mesh topology, a star topology, etc.).

The head-end system 102 may keep track of adjustable configuration parameters of the nodes 106 and 108a-108h. The adjustable configuration parameters may include any parameters of the nodes 106 and 108a-108h that are adjustable for resource metering calibration or for utility specific tracking, such as peak resource demand periods or periods of increased or decreased resource cost. To track the adjustable configuration parameters of the nodes 106 and 108a-108h, the nodes 106 and 108a-108h may periodically communicate with the head-end system 102 through the mesh network 101 to report changes to the adjustable configuration parameters or to report potential tampering of the nodes 106 and 108a-108h. The reported communications may indicate to the head-end system 102 that one or more of the nodes 106 and 108a-108h require further investigation to determine if and when the nodes 106 and 108a-108h were compromised by a tampering event.

In a specific example, the node 108d, which may be a metering device for metering resource consumption at a residential or commercial premises, may be compromised by a tool 110. The tool 110 may be an optical port tool that communicates with the node 108d using an optical signal 112. The optical signal 112 may provide instructions from a communications adapter 114 of the tool 110 to adjust the adjustable configuration parameters of the node 108d. For example, in response to receiving the optical signal 112, the node 108d may adjust a parameter identifying peak resource demand periods of the resource metered by the node 108d. In some examples, the tool 110 is able to adjust only those parameters of the node 108d that are available for adjustment after initial calibration of the node 108d. That is, the node 108d may include configuration parameters that are not adjustable after initial calibration of the node 108d is complete in addition to the adjustable configuration parameters that are capable of adjustment, for example, in the field by the tool 110.

Continuing with this example, a random audit may be performed on the nodes 106 and 108a-108h. In such an example, the head-end system 102 may send a signal requesting information from the nodes 106 and 108a-108h corresponding to the adjustable configuration parameters of the nodes 106 and 108a-108h. In some examples, the signal may be a unicast or multicast signal provided to one or more specific nodes or groups of nodes 106 and 108a-108h on the mesh network 101. The head-end system 102 may compare the information received from the nodes 106 and 108a-108h with information that the head-end system 102 expected to receive. If a discrepancy is detected, the head-end system 102 may initiate a remediation action, such as deploying a technician to replace the compromised node 106 or 108a-108h or to reset the adjustable parameters of the compromised node 106 or 108a-108h. These audits may occur over randomized time intervals using multi-cast signals to initiate the audit to limit an impact of reporting traffic congestion on the mesh network 101. In other examples, the audit may be initiated with a broadcast signal to all of the nodes 106 and 108a-108h on the mesh network 101. In such an example, the responses from the nodes 106 and 108a-108h may be transmitted at random time intervals to avoid data traffic congestion on the mesh network 101.

In another example, radios of the nodes 106 and 108a-108h that communicatively couple the nodes 106 and 108a-108h to the mesh network 101 may internally determine if the adjustable configuration parameters have changed. Because internal data traffic between the radios and meters 204 of the nodes 106 and 108a-108h is not as much of a concern, the audit initiated by the radios may occur at regular intervals instead of random intervals. If a change is detected, the radios may report that a node 106 or 108a-108h has been compromised to the head-end system 102. Upon receiving the indication that the node 106 or 108a-108h has been compromised, the head-end system 102 may initiate a remediation action, such as deploying a technician to replace the compromised node 106 or 108a-108h or to reset the adjustable parameters of the compromised node 106 or 108a-108h.

Figure 2:
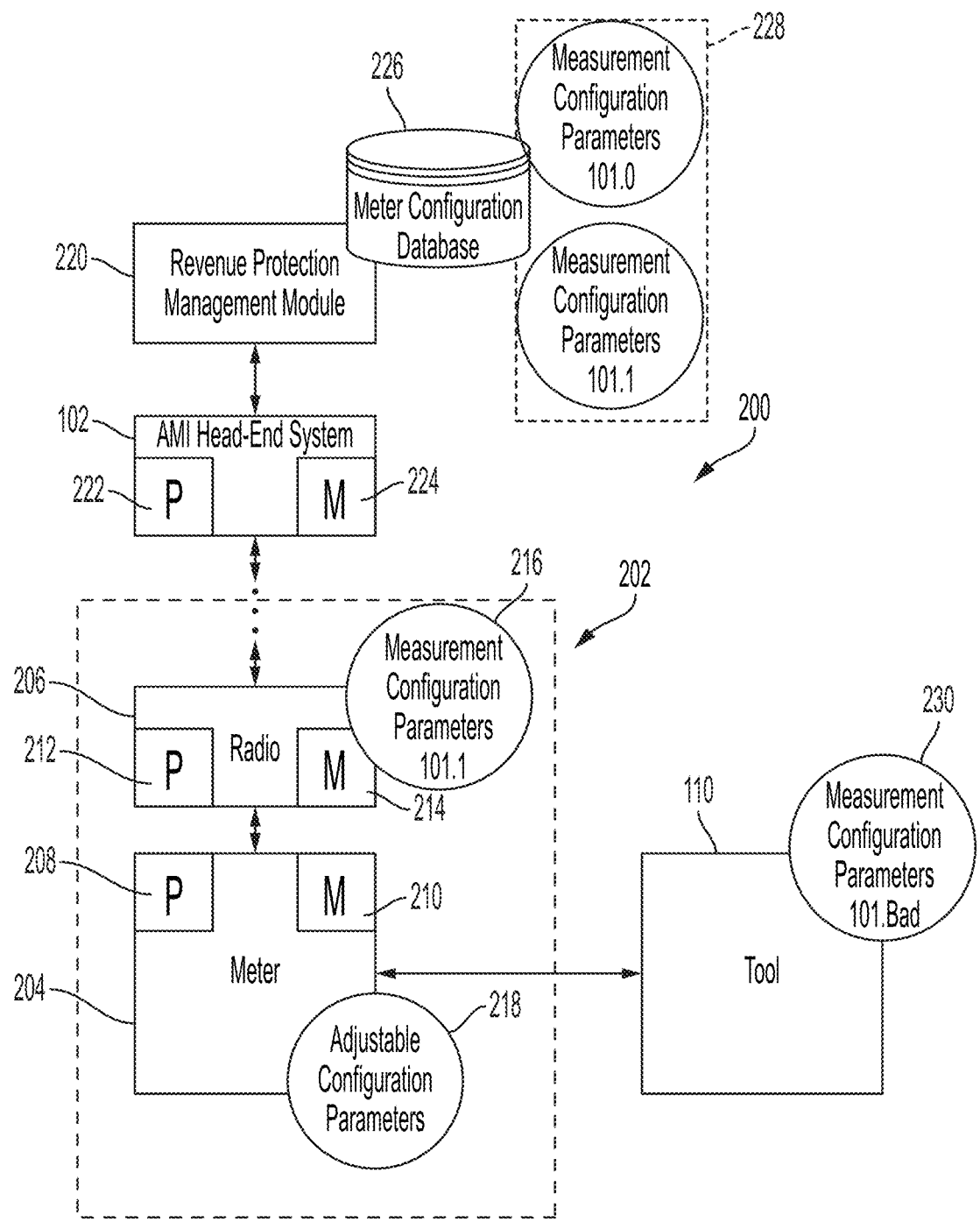
FIG. 2 is a block diagram of a communication path between a head-end system and a metering device, in accordance with one or more examples.

FIG. 2 a block diagram of a communication path 200 between the head-end system 102 and a metering device 202, such as the node 108d. The metering device 202 may include a meter 204 and a radio 206. The meter 204, which may also be referred to as a configurable metrology module, may meter resource consumption, such as power, water, gas, or heat, at a premises of the resource consumption (e.g., a residential or commercial building). A processor 208 may execute instructions stored on a memory device 210 to perform the metering operations of the meter 204. Further, the meter 204 may provide information in the form of electronic data to the radio 206 for eventual communication with the head-end system 102, and the meter 204 may communicate with the tool 110 that is able to adjust the adjustable configuration parameters of the metering device 202.

The radio 206 of the metering device 202 may communicate with other nodes 106 or 108a-108h in the mesh network 101 to transmit or receive information to and from the head-end system 102. In an example, a processor 212 may execute instructions stored on a memory device 214 to operate the communication functionalities of the radio 206. In some examples, the memory device 214 may store an indication of expected measurement configuration parameters 216. The indication of the expected measurement configuration parameters 216 stored in the memory device 214 of the radio 206 may represent an indication of the adjustable configuration parameters that the radio 206 expects to receive whenever the radio initiates an audit of indications of adjustable configuration parameters 218 stored in the memory device 210 of the meter 204. In an example, because the tool 110 is designed to adjust only the adjustable configuration parameters 218 themselves, and not, for example, indications of the expected measurement configuration parameters 216 stored in the memory device 214 of the radio 206, there may be limited concern for tampering with the indications of the expected measurement configuration parameters 216.

In another example, the radio 206 may communicate an indication of the adjustable configuration parameters 218 to the head-end system 102. That is, instead of the radio 206 detecting a potential compromise of the adjustable configuration parameters of the meter 204, the head-end system 102 may use a revenue protection management module 220 to make a determination as to whether the meter 204 has been compromised. In an example, the head-end system 102 may include a processor 222 and a memory device 224, where the processor 222 executes instructions stored on the memory device 224 to perform functions of the head-end system 102. For example, the processor 222 may execute the instructions associated with the revenue protection management module 220 that are stored in the memory device 224.

The revenue protection management module 220 may compare the data received from the radio 206 of the metering device 202 with data stored in a meter configuration database 226. In an example, the meter configuration database 226 may include representations 228 of the adjustable configuration parameters of the meter 204. For example, the representations 228 may include a log of the adjustable configuration parameters of the meter 204 over time. By comparing the data received from the radio 206 with the representations 228, the revenue protection management module 220 of the head-end system 102 may determine if the adjustable configuration parameters 218 of the meter 204 have been compromised.

In an example, the adjustable configuration parameters 218 of the meter 204 may be changed by the tool 110. In some examples, access to the tool 110 capable of changing the adjustable configuration parameters 218 may have been obtained through means that were not sanctioned by a utility provider that operates the metering device 202. The tool 110 may provide instructions to the meter 204 to change the adjustable configuration parameters of the meter 204 in a manner that is beneficial to the resource consumer at the premises of the metering device 202. An audit may be performed at a time subsequent to adjustment of the adjustable configuration parameters 218 by the radio 206 or the head-end system 102 to detect the compromised adjustable configuration parameters 218 of the meter 204.

When an audit is initiated by the radio 206 or the head-end system 102, the meter 204 may provide an indication of the adjustable configuration parameters 218 using a digital cryptographic hash representation (e.g., using an SHA256 cryptographic hash function), a cyclic redundancy check (CRC) representation, or another encoded representation of the adjustable configuration parameters 218. By encoding the representation of the adjustable configuration parameters 218, the radio 206 or the head-end system 102 may be able to make a determination about whether the meter 204 has been compromised with a much more computationally efficient comparison. For example, the encoded representation of the adjustable configuration parameters 218 is compared to an encoded representation of the expected measurement configuration parameters 216 at the radio 206 or the representations 228 of the measurement configuration parameters at the head-end system 102. Further, in some examples, only a portion of the encoded representation of the adjustable configuration parameters 218 is compared to a corresponding portion of the encoded representation of the expected configuration parameters 216 at the radio 206 or the representations 228 at the head-end system 102. By only comparing a portion of the encoded representations, computing efficiency in making the comparisons is further enhanced.

Further, with thousands, and in some cases millions, of metering devices being remotely managed, any reduction in messaging or messaging size has tangible benefits to the device owner. Accordingly, transmitting the encoded representation of the adjustable configuration parameters 218 to the head-end system 102 for comparison may reduce an amount of networking gear (e.g., routers and bridges) used for the audit. Additionally, transmission of the encoded representation may occupy less network capacity when compared to a full representation of the configuration parameters 218.

Figure 3:
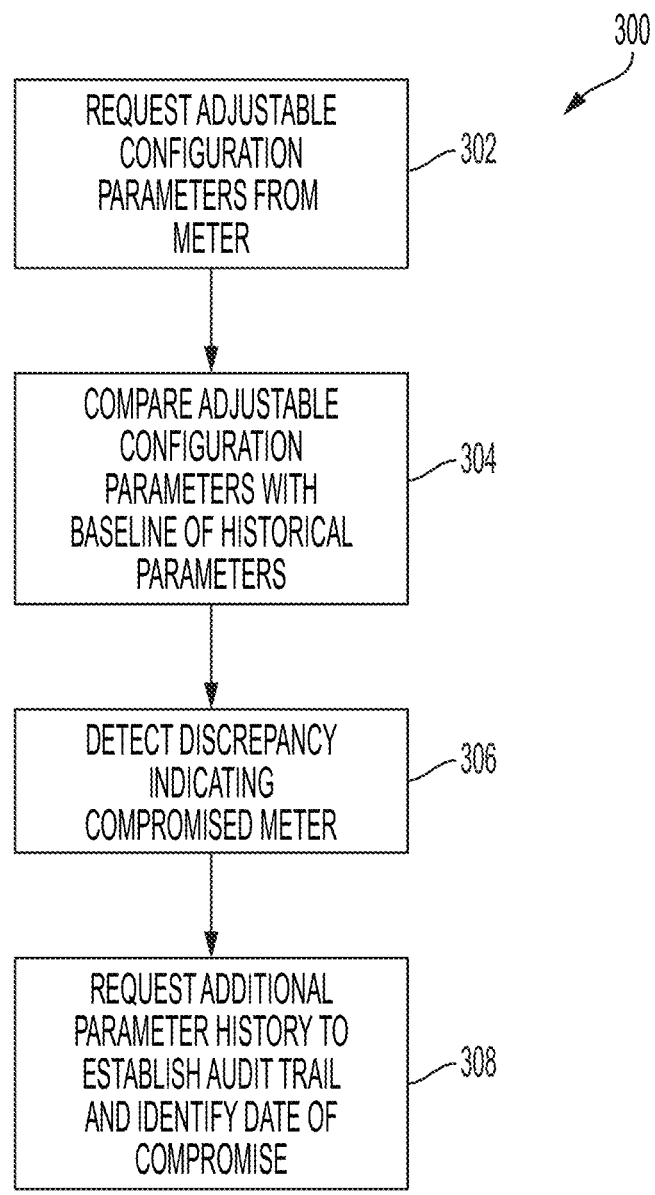
FIG. 3 is a flowchart of a process for detecting tampering at a metering device from a head-end system, in accordance with one or more examples.

FIG. 3 is a block diagram of a process 300 for detecting tampering at a metering device 202 from a head-end system 102. At block 302, the process 300 involves requesting, by the head-end system 102, an indication of the adjustable configuration parameters 218 from the meter 204 of the metering device 202. In an example, the radio 206 may provide the indication of the adjustable configuration parameters 218 to the head-end system 102. The request for the indication of the adjustable configuration parameters 218 may be performed on a randomized basis. The randomized basis of the request may ensure that data packets from all of the nodes 106 and 108a-108h in the mesh network 101 are not sent to the head-end system 102 at the same time.

In some examples, the indication of the adjustable configuration parameters 218 may be added as a data packet in addition to other information periodically reported to the head-end system 102. For example, the indication of the adjustable configuration parameters 218 may accompany data associated with consumption recorded by the meter 204. In other examples, the indication of the adjustable configuration parameters 218 may be provided as a stand-alone communication with the head-end system 102.

At block 304, the process 300 involves comparing the indication of the adjustable configuration parameters 218 to a baseline of historical configuration parameter representations, such as the representations 228 of the measurement configuration parameters stored at the head-end system 102. In some examples, the indication of the adjustable configuration parameters 218 includes a digital cryptographic hash, CRC, or other encoded representation of the adjustable configuration parameters 218. To enhance computational efficiency, only a portion of the encoded representation of the adjustable configuration parameters 218 is compared to a portion of encoded versions of the representations 228 of the measurement configuration parameters stored at the head-end system 102. In some examples, the portion of the encoded representation of the adjustable configuration parameters 218 is the only data that is communicated to the head-end system 102 by the metering device 202 for comparison. This encoded representation comparison may enable the head-end system 102 to detect a difference between the adjustable configuration parameters 218 and the representations 228 of the measurement configuration parameters without requiring the metering device 202 to transmit a full parameter list of the metering device 202.

At block 306, the process 300 involves detecting a discrepancy between the adjustable configuration parameters 218 and expected adjustable configuration parameters, such as in the representations 228 of the measurement configuration parameters. The detected discrepancy can indicate that the adjustable configuration parameters 218 of the meter 204 were compromised. Further, the discrepancy may be detected based on determining a difference between the representation of the adjustable configuration parameters 218 and the representations 228 of the measurement configuration parameters at the head-end system 102.

At block 308, the process 300 involves requesting additional parameter history from the metering device 202 to establish an audit trail and to identify a date or a date range in which the metering device 202 was compromised. In an example, the additional parameter history may be evaluated to determine when the adjustable configuration parameters 218 of the meter 204 departed from expected measurement configuration parameters. In this manner, the head-end system 102 can establish a timeline to establish when tampering occurred at the meter 204.

In some examples, the head-end system 102 may also initiate a remediation action to restore the meter 204 to the correct adjustable configuration parameters 218. For example, the head-end system 102 may deploy a technician to replace the meter 204 or to change the adjustable configuration parameters 218 of the meter 204 to an appropriate setting.

Figure 4:
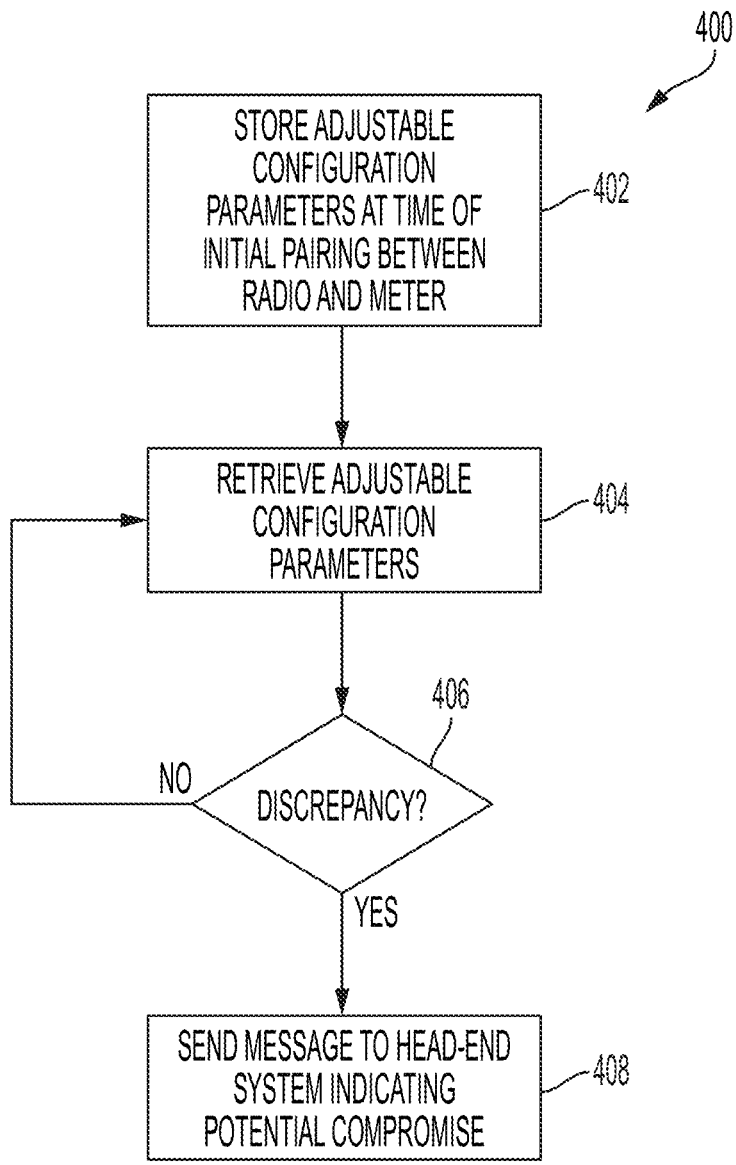
FIG. 4 is a flowchart of a process for detecting tampering at a metering device from a radio of the metering device, in accordance with one or more examples.

FIG. 4 is a flowchart of a process 400 for detecting tampering at the metering device 202 from the radio 206 of the metering device 202. At block 402, the process 400 involves storing, at the radio 206, the adjustable configuration parameters 218 of the meter 204 at a time of initial pairing between the radio 206 and the meter 204. Storing the adjustable configuration parameters 218 at the radio 206 may also occur every time the adjustable configuration parameters 218 are adjusted in an authorized manner. For example, authorized adjustments to the adjustable configuration parameters 218 can be made from the head-end system 102 or using the tool 110 by a technician onsite at the metering device 202. The authorized adjustments may be tracked in an event in a log of the metering device 202. In some examples, the authorized adjustments may be accompanied by cryptographic authentication to authenticate the authorized adjustments. The authorized adjustable configuration parameters 218 may be stored as an indication of the expected measurement configuration parameters 216 at the radio 206. In an example, the radio 206 may create a baseline of historical changes to the adjustable configuration parameters 218.

At block 404, the process 400 involves retrieving an indication of the adjustable configuration parameters 218 from the meter 204. The radio 406 may retrieve the indication of the adjustable configuration parameters 218 on a daily basis, at any other regular interval, or on randomized intervals. In some examples, the meter 204 may push the indication of the adjustable configuration parameters 218 to the meter 204. The push of the indication by the meter 204 may also be performed regularly or on a randomized basis.

At block 406, the process 400 involves determining if there is a discrepancy between the adjustable configuration parameters 218 and the expected measurement configuration parameters 216 at the radio 206. This process may be similar to the discrepancy detection at the head-end system 102 discussed above with respect to block 306. For example, the indication of the adjustable configuration parameters 218 may be a portion of an encoded representation of the adjustable configuration parameters 218, and the discrepancy may be determined by comparing the portion of the encoded representation with a portion of an encoded representation of the expected measurement configuration parameters 216.

If no discrepancy is detected, the process 400 may return to block 404 where a subsequent audit of the adjustable configuration parameters 218 is performed. If a discrepancy is detected, at block 408, the process 400 involves sending a message from the radio 206 to the head-end system 102 indication the potential compromise. The head-end system 102 may then take remedial actions such as establishing an audit trail, as in block 308 of the process 300, and replacing the meter 204 or resetting the adjustable configuration parameters 218 to acceptable settings.

In some examples, upon detecting the discrepancy, the radio 206 may review the baseline of historical changes to the adjustable configuration parameters 218 to establish an audit trail and to identify a date or a date range in which the metering device 202 was compromised. In an example, the additional parameter history may be evaluated to determine when the adjustable configuration parameters 218 of the meter 204 departed from expected measurement configuration parameters. In this manner, the radio 206 can establish a timeline to establish when tampering occurred at the meter 204. In some examples, the historical changes may be encoded by the metering device 202 using a CRC or a digital cryptographic hash and stored as encoded data.

The subject matter of the presently disclosed examples is described herein with specificity to meet statutory requirements, but this description is not necessarily intended to limit the scope of the presently disclosed subject matter. The disclosed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The foregoing is provided for purposes of illustrating, explaining, and describing various examples. Having described these examples, it will be recognized by those of skill in the art that various modifications, alternative constructions, and equivalents may be used without departing from the spirit of what is disclosed. Different arrangements of the components depicted in the drawings or described above, as well as additional components and steps not shown or described, are possible. Certain features and subcombinations of features disclosed herein are useful and may be employed without reference to other features and subcombinations. Additionally, a number of well-known processes and elements have not been described in order to avoid unnecessarily obscuring the examples. Examples have been described for illustrative and not restrictive purposes, and alternative examples will become apparent to readers of this patent. Accordingly, examples are not limited to those described above or depicted in the drawings, and various modifications can be made without departing from the scope of the presently disclosed subject matter.

That which is claimed is:

1. A method, comprising:
   storing, at a head-end system, an indication of initial configuration parameters of a configurable resource meter, wherein the initial configuration parameters comprise adjustable parameters of the configurable resource meter that are adjustable to change how a resource is metered;
   requesting, by the head-end system, a report indicating updated configuration parameters from the configurable resource meter;
   receiving, at the head-end system, the report indicating the updated configuration parameters of the configurable resource meter;
   comparing an indication of the updated configuration parameters to the indication of the initial configuration parameters; and
   determining a potential compromise of the configurable resource meter when the indication of the updated configuration parameters is different from the indication of the initial configuration parameters.

2. The method of claim 1, wherein the report indicating the updated configuration parameters comprises a cyclic redundancy check or a digital cryptographic hash of the indication of the updated configuration parameters.

3. The method of claim 2, wherein comparing the indication of the updated configuration parameters with the indication of the initial configuration parameters comprises comparing the cyclic redundancy check or the digital cryptographic hash of the indication of the updated configuration parameters with a cyclic redundancy check or a digital cryptographic hash of the indication of the initial configuration parameters.

4. The method of claim 1, further comprising:
   requesting, by the head-end system, historical configuration parameter representations of the configurable resource meter to generate an audit trail and to confirm a compromise of the configurable resource meter.

5. The method of claim 1, further comprising:
   periodically requesting, by the head-end system, additional reports of indications of additional updated configuration parameters when the potential compromise is not detected from the indication of the updated configuration parameters.

6. The method of claim 5, further comprising:
   comparing the indications of the additional updated configuration parameters to the indication of the initial configuration parameters; and
   determining the potential compromise of the configurable resource meter when the indications of the additional updated configuration parameters are different from the indication of the initial configuration parameters.

7. The method of claim 1, wherein requesting the report indicating the updated configuration parameters comprises broadcasting a request for the report indicating the updated configuration parameters to a plurality of configurable resource meters, and wherein the report indicating the updated configuration parameters is only received from the configurable resource meters of the plurality of configurable resource meters with changes to the configuration parameters.

8. The method of claim 1, wherein the configurable resource meter comprises an electric meter, a gas meter, a water meter, or a heat meter.

9. A metering system comprising:
   a configurable metrology module configured to meter resource consumption; and
   a radio configured to communicate with the configurable metrology module and with a head-end system, wherein the radio comprises:
   a processor; and
   a memory comprising instructions stored thereon, wherein the instructions are executable by the processor to perform operations comprising:
      receiving an indication of initial configuration parameters from the configurable metrology module when the radio and the configurable metrology module are first paired, wherein the initial configuration parameters comprise adjustable parameters of the configurable metrology module that are adjustable to change how the configurable metrology module meters resource consumption;
      requesting a report indicating updated configuration parameters from the configurable metrology module;
      comparing an indication of the updated configuration parameters with the indication of the initial configuration parameters; and
      reporting a potential compromise of the configurable metrology module to a head-end system when the indication of the updated configuration parameters are different from the indication of the initial configuration parameters.

10. The metering system of claim 9, wherein the report indicating the updated configuration parameters comprises a cyclic redundancy check or a digital cryptographic hash of the indication of the updated configuration parameters.

11. The metering system of claim 10, wherein the operation of comparing the indication of the updated configuration parameters with the indication of the initial configuration parameters comprises comparing the cyclic redundancy check or the digital cryptographic hash of the indication of the updated configuration parameters with a cyclic redundancy check or a digital cryptographic hash of the indication of the initial configuration parameters.

12. The metering system of claim 9, wherein the operation of requesting the report indicating the updated configuration parameters occurs at a regular interval.

13. The metering system of claim 9, wherein the configurable metrology module is configured to meter electricity, gas, water, or heat.

14. The metering system of claim 9, the operations further comprising:
receiving a request from the head-end system for an indication of historical configuration parameters of the configurable metrology module to generate an audit trail and to confirm a compromise of the configurable metrology module; and
transmitting the indication of the historical configuration parameters of the configurable metrology module to the head-end system.

15. A head-end system, comprising:
a processor; and
a memory comprising instructions stored thereon, wherein the instructions are executable by the processor for causing the processor to perform operations comprising:
storing an indication of initial configuration parameters of a configurable resource meter, wherein the initial configuration parameters comprise parameters of the configurable resource meter that are adjustable to change how a resource is metered;
requesting a report indicating updated configuration parameters from the configurable resource meter;
receiving the report indicating the updated configuration parameters of the configurable resource meter;
comparing an indication of the updated configuration parameters to the indication of the initial configuration parameters; and
determining a potential compromise of the configurable resource meter when the indication of the updated configuration parameters is different from the indication of the initial configuration parameters.

16. The head-end system of claim 15, wherein the report indicating the updated configuration parameters comprises a cyclic redundancy check or a digital cryptographic hash of the indication of the updated configuration parameters.

17. The head-end system of claim 16, wherein the operation of comparing the indication of the updated configuration parameters with the indication of the initial configuration parameters comprises comparing the cyclic redundancy check or the digital cryptographic hash of the indication of the updated configuration parameters with a cyclic redundancy check or a digital cryptographic hash of the indication of the initial configuration parameters.

18. The head-end system of claim 15, wherein the operations further comprise:
requesting an indication of additional historical configuration parameters of the configurable resource meter to generate an audit trail and confirm a compromise of the configurable resource meter.

19. The head-end system of claim 15, wherein the operation of requesting the report indicating the updated configuration parameters comprises broadcasting a request for the report indicating the updated configuration parameters to a plurality of configurable resource meters, and wherein the report indicating the updated configuration parameters is only received from the configurable resource meters of the plurality of configurable resource meters with changes to the configuration parameters.

* * * * *